US 8,068,247 B2

(12) United States Patent
Wu

(10) Patent No.: US 8,068,247 B2
(45) Date of Patent: Nov. 29, 2011

(54) SYSTEM AND METHOD FOR USERS OF MOBILE COMPUTING DEVICES TO PRINT DOCUMENTS

(75) Inventor: Zhanbing Wu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 11/038,884

(22) Filed: Jan. 20, 2005

(65) Prior Publication Data

US 2005/0132094 A1 Jun. 16, 2005

Related U.S. Application Data

(63) Continuation of application No. 10/180,764, filed on Jun. 26, 2002.

(51) Int. Cl.
G06F 3/00 (2006.01)
(52) U.S. Cl. ............. 358/1.15; 358/1.12; 358/1.13; 358/1.14; 358/1.16; 358/1.18; 709/217; 709/226; 709/202; 709/203; 709/206; 710/8
(58) Field of Classification Search .......... 358/1.15, 358/1.13, 407, 1.1, 1.16, 1.6; 725/112; 707/9, 707/10, 104.1; 709/203, 216, 226; 715/523, 715/741, 760
See application file for complete search history.

(56) References Cited

U.S. PATENT DOCUMENTS

| 5,625,757 | A |  | 4/1997 | Kageyama et al. |
| 5,862,310 | A | * | 1/1999 | Crawford et al. ............ 358/1.18 |
| 6,012,083 | A | * | 1/2000 | Savitzky et al. ............. 709/202 |
| 6,256,666 | B1 | * | 7/2001 | Singhal ........................ 709/217 |
| 6,288,790 | B1 | * | 9/2001 | Yellepeddy et al. ......... 358/1.15 |
| 6,397,261 | B1 |  | 5/2002 | Eldridge et al. |
| 6,452,692 | B1 | * | 9/2002 | Yacoub ........................ 358/1.15 |
| RE38,111 | E | * | 5/2003 | LaDue et al. ................... 400/68 |
| 6,717,686 | B1 | * | 4/2004 | Farros et al. ................... 358/1.1 |
| 6,952,780 | B2 | * | 10/2005 | Olsen et al. ...................... 726/26 |
| 7,003,723 | B1 | * | 2/2006 | Kremer et al. ................. 715/234 |
| 7,031,004 | B1 | * | 4/2006 | Hayward et al. ............ 358/1.15 |
| 7,081,969 | B1 | * | 7/2006 | Motamed et al. ............ 358/1.16 |
| 7,318,086 | B2 | * | 1/2008 | Chang et al. .................. 709/217 |
| 2002/0024686 | A1 | * | 2/2002 | Uchiyama et al. ............ 358/407 |
| 2002/0075508 | A1 | * | 6/2002 | Luman ........................ 358/1.15 |

(Continued)

FOREIGN PATENT DOCUMENTS

CN 1242545 1/2000

(Continued)

OTHER PUBLICATIONS

"Print Me," retrieved at https://www.printme.com/topology.html/357elf74f08522d564a33fbfb6903888,Oct. 24, 2001 (1 pg.).

(Continued)

Primary Examiner — Twyler Haskins
Assistant Examiner — Pawandeep Dhingra

(57) ABSTRACT

A print service is provided on a network, such as the Internet or a corporate intranet, for mobile computing devices, such as laptops, PDA's and Web cell phones, etc., to print documents. When the user of a mobile device wants to print a document, the mobile device is used to access the print service and send a print request that specifies the location the document on the network in terms of URL. In response, the print service validates the print request, retrieves the document, renders the document for printing, and prints the document as requested by the user. Alternatively, the document may be directly provided by the mobile device to the print service.

15 Claims, 4 Drawing Sheets

U.S. PATENT DOCUMENTS

| | | | |
|---|---|---|---|
| 2002/0116439 A1* | 8/2002 | Someshwar et al. | 709/104 |
| 2002/0120742 A1* | 8/2002 | Cherry | 709/226 |
| 2002/0126306 A1* | 9/2002 | Chohsa et al. | 358/1.13 |
| 2002/0126780 A1* | 9/2002 | Oshima et al. | 375/347 |
| 2002/0158812 A1* | 10/2002 | Pallakoff | 345/5 |
| 2003/0018744 A1* | 1/2003 | Johanson et al. | 709/217 |
| 2003/0038965 A1* | 2/2003 | Simpson et al. | 358/1.15 |
| 2003/0081237 A1* | 5/2003 | Ogiwara et al. | 358/1.14 |
| 2003/0169446 A1* | 9/2003 | Grohs et al. | 358/1.15 |
| 2004/0075860 A1* | 4/2004 | Shima et al. | 358/1.15 |

FOREIGN PATENT DOCUMENTS

| | | |
|---|---|---|
| GB | 2342195 | 4/2000 |
| JP | 11146118 | 5/1999 |
| JP | 2001282469 | 10/2001 |
| JP | 2002175163 | 6/2002 |
| KR | 199863477 | 10/1998 |
| MY | 141125 | 3/2010 |

OTHER PUBLICATIONS

Lamming et al., "Satchel: Providing Access to Any Document, Any Time, Anywhere," (28 pgs.).

"JP Notice of Rejection", Application Serial No. 2003-183598, (Mar. 11, 2009),12 pages.

"EP Search Report", Application No. 03012545.4, (Feb. 19, 2007),2 pages.

"Foreign Office Action", Application Serial No. 10-2003-41404, (Dec. 4, 2009),16 pages.

"Foreign Office Action", Canadian Application No. 2432063, (Aug. 2, 2010),3 pages.

"Foreign Office Action", Chinese Application No. 200910006756.6, (Jul. 13, 2010),12 pages.

"JP Final Rejection", Appln No. 2003-183598, (Sep. 17, 2009),2 pages.

"Notice of Publication", Application Serial No. 200910006756.6, (Sep. 25, 2009),2 pages.

"Second Office Action", Polish Application No. 360753, (Jan. 18, 2010),6 pages.

"Foreign Office Action", Canadian Application No. 2432063, (Apr. 21, 2011), 5 pages.

"Foreign Office Action", Chinese Application No. 200910006756.6, (May 11, 2011), 16 pages.

* cited by examiner

SYSTEM AND METHOD FOR USERS OF MOBILE COMPUTING DEVICES TO PRINT DOCUMENTS

RELATED APPLICATION

This application is a continuation of the coassigned and copending U.S. patent application Ser. No. 10/180,764, filed on Jun. 26, 2002, and entitled "System and Method for Users of Mobile Computing Devices to Print Documents." Priority is hereby claimed to this case under 35 U.S.C. §120.

TECHNICAL FIELD OF THE INVENTION

This invention relates generally to computer printing, and more particularly to a way to enable users of mobile computing devices to print documents conveniently.

BACKGROUND OF THE INVENTION

As the Internet matures, more and more functions, such as email, calendar, file storage, authentication, etc., have moved to the World Wide Web on the Internet. With the increasing availability of high-speed Internet access everywhere, customers are shifting their priority to Internet-based mobile scenarios, especially with wireless Internet connection. Thus, many mobile computing devices are now equipped with wireless Internet access capabilities, and there is a proliferation of new Internet devices in a wide range of form factors, such as Web cell phones (i.e., cell phones with the ability to connect to the Internet wirelessly), etc. There are now millions of on-the-go people who access their data, documents, and e-mail from their cell phones and other hand-held devices.

Even though mobile devices provide their users with the freedom to access the Internet or other networks without being tied to their desktop computers, most small mobile devices, such as PDA's or Web cell phones, have very small display screens, and it is somewhat inconvenient and often difficult to read regular documents (e.g., a spread sheet) on such small screens. For this reason, users of small mobile devices may want to print the documents out and read the printed documents. After all, paper is a great viewing media that is portable, easy to read, and easy to share. In addition, it requires no power. The combination of rich contents available on the Internet and the physical limitation of small devices means that users would want to print the contents from time to time at any place where they can access the content.

Currently there is, however, no convenient way for mobile device users to print documents when they are away from their desktop computers. Traditionally, it is difficult even for users of laptop computers to print documents while away from their offices. For instance, when a user carries her laptop to a different building of her company for a meeting, even if she can log onto the corporate intranet and retrieve a document she needs for the meeting, she may find that she is not able to print that document easily. In order to print the document on a printer in that building, she has to first discover which printers are in the building, select a printer that is close to her, and download the driver for that printer to her laptop. She then runs an appropriate application (e.g., Microsoft Word, Adobe Acrobat Reader, etc.) for that particular document format, which renders the document into a printer-acceptable format and uses the print driver to print the document. When the user moves to a new location and wants to print on a different printer, she has to repeat the printer installation process.

In comparison with printing with laptops, it is even harder for users of small Internet devices to print documents. There is currently a diverse set of hardware and operating system platforms for those "thin-client" devices. Such diversity would make it very difficult to develop a robust set of printer drivers for each hardware/OS platform. Moreover, print rendering generally requires intensive CPU power and memory consumption. Many small mobile devices simply do not have the memory space to store the applications or the printer drivers or the processing power required for the printing operation.

Thus, what is needed is an effective solution for users of various types of mobile devices to print documents when and where they need the documents even if the devices are not connected directly to any printers or do not even have the capacity or software to handle the printing task.

SUMMARY OF THE INVENTION

In view of the foregoing, the present invention provides a network printing service that enables mobile computing devices, such as laptop computer, Personal Digital Assistant (PDA) devices, Web cell phones, etc., to print documents easily even though they are not directly connected to a printer or do not support the applications and printer drivers for printing. When the user of a mobile computing device wants to print a document, the mobile device is used to access a network, such as the Internet, on which the print service resides. The print service includes a print service interface for interacting with the client to receive print request data, a router component for processing the print request, and a rendering component for converting documents from a source document format to a target format for printing. Using the print service interface, the user enters a print request, which identifies the location of the document on the network (e.g., in terms of the document's URL). Alternatively, the document may be directly passed from the mobile device to the print service. If applicable, the user also specifies the target printer through the same interface. When the print service receives the request, if the request gives the document's URL, it retrieves the document corresponding to that URL, renders the document into an appropriate target format, and prints the document as requested by the user.

The network print service framework of the invention can be implemented not only on the Internet, but also on networks of different sizes, such as corporate intranets, home LAN or the like.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF PREFERRED EMBODIMENT

Figure 1:
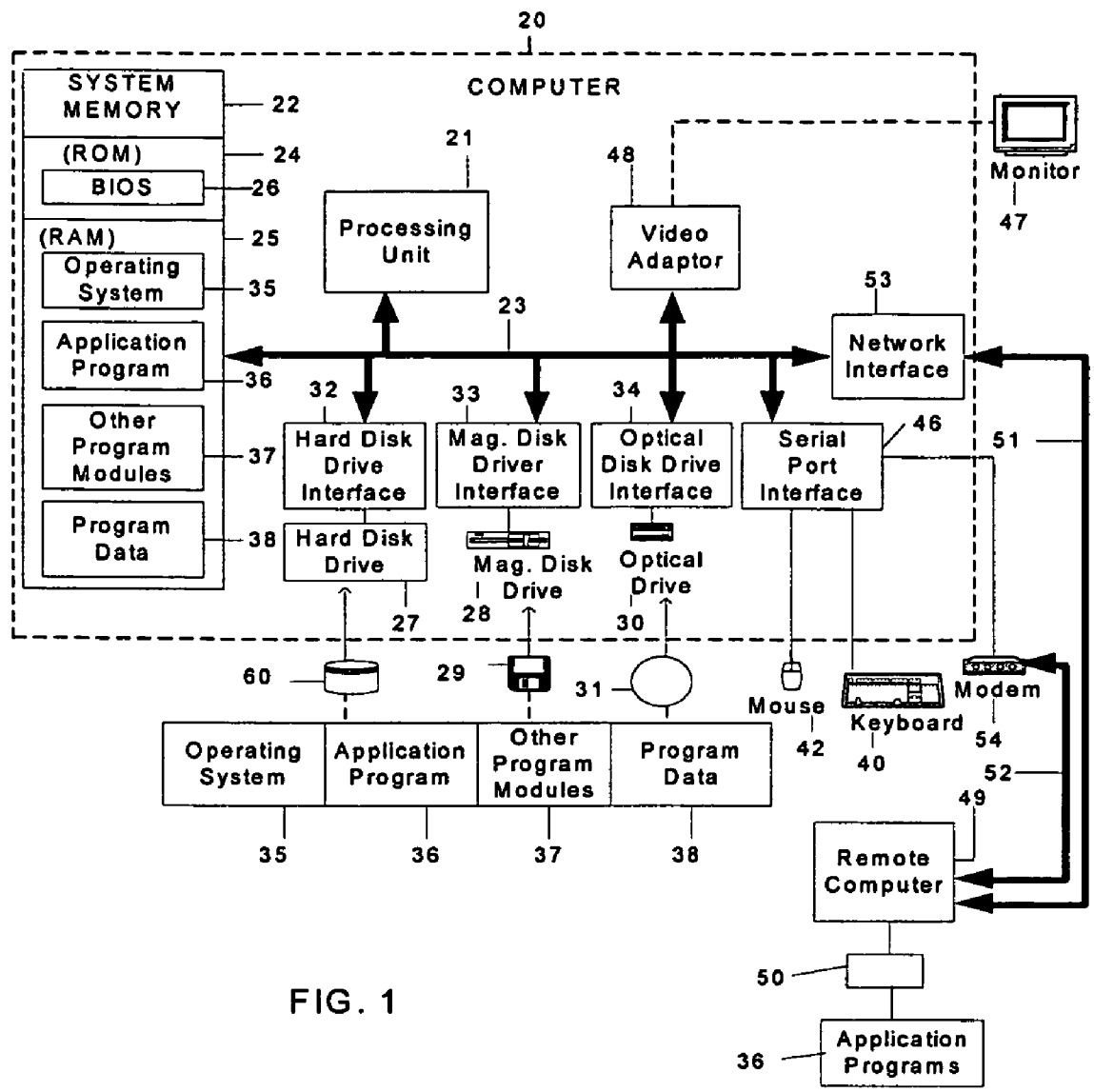
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 3:
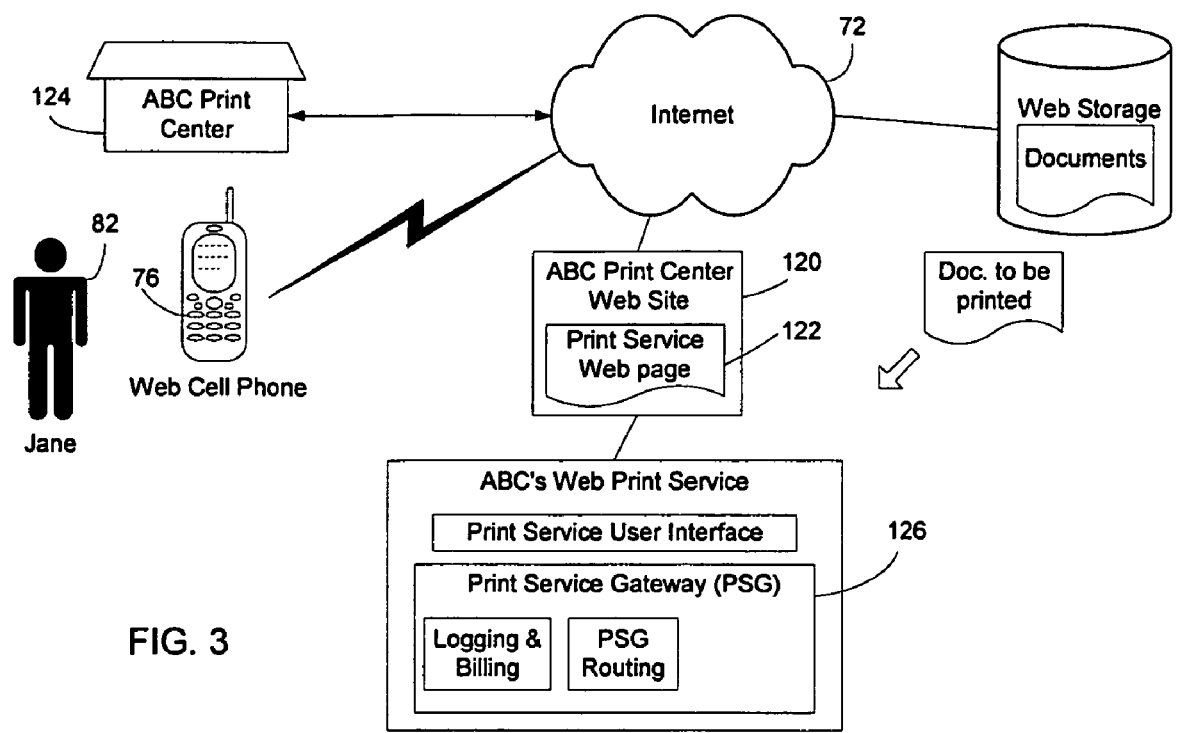
FIG. 3 is a schematic diagram showing another exemplary embodiment of a print service on the Internet.
Figure 4:
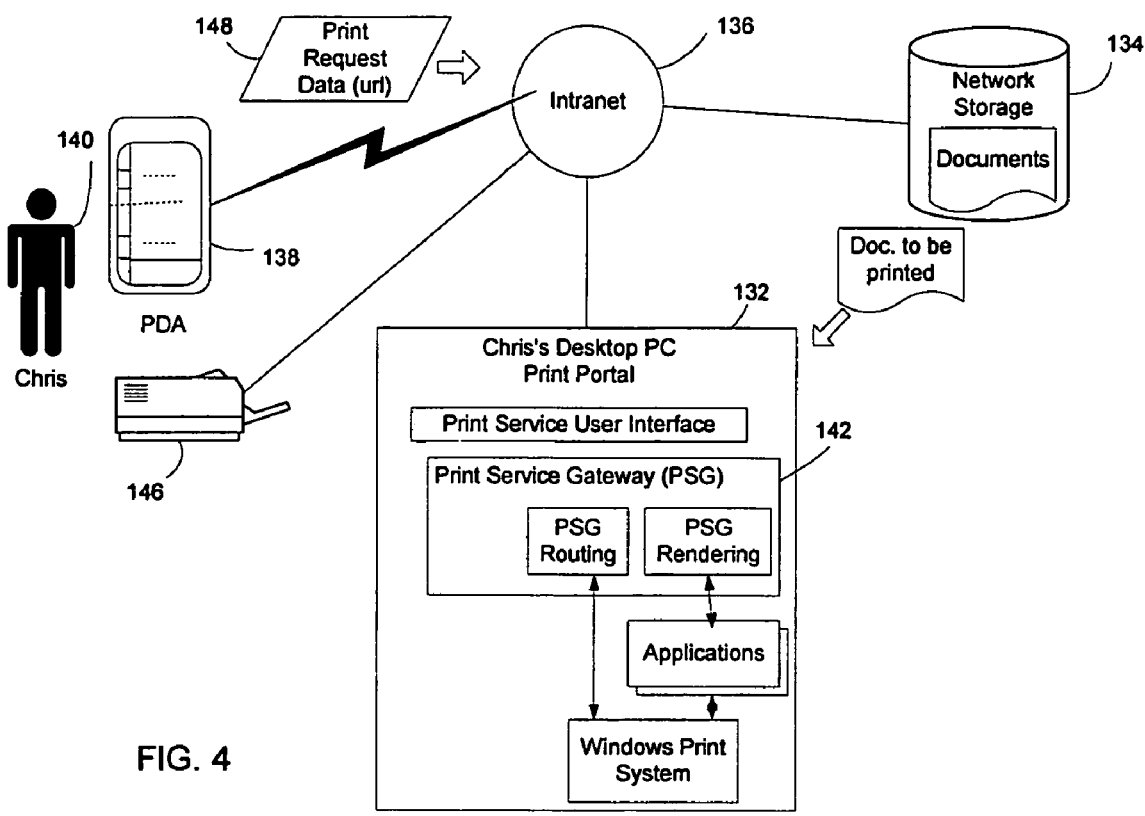
FIG. 4 is a schematic diagram showing an embodiment of a print service gateway residing on a user's personal computer and accessible over a corporate intranet.

The following description begins with a description of a general-purpose computing device that may be used in an exemplary system for implementing the invention, and the invention will be described in greater detail with reference to FIGS. 2-4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives include computer-readable media that provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and any other suitable hardware storage device may also be used in the exemplary operating environment. As discussed herein, computer-readable storage media exclude carrier waves and transitory media.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. For instance, the computer may be in the form of a laptop computer and equipped with wireless transmission and networking capabilities for wireless connections to the Internet or other networks.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
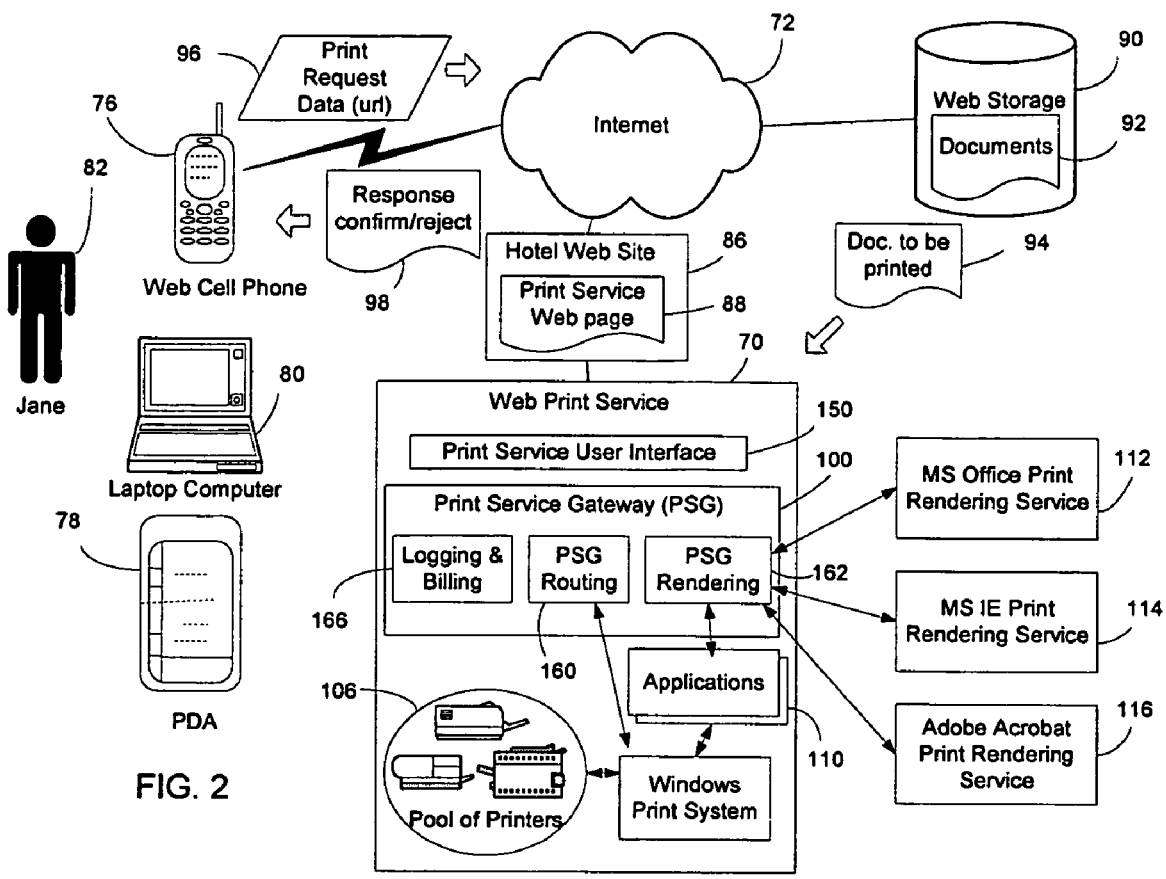
FIG. 2 is a schematic diagram showing an exemplary embodiment of a print service provided on the Internet for processing print requests by users of mobile Internet devices.

Turning now to FIG. 2, the present invention is directed to a print service architecture that allows the user of a mobile computing device, such as a laptop computer, a PDA, a Web cell phone (or "smart cell phone"), etc., to print documents even if the mobile device has no direct connection with or control over a printer, and even if the device has no processing power or memory capacity for applications and printer drivers required to perform the printing operations. In accordance with the invention, the mobile device is not required to handle the rendering of the document into a format acceptable to the printer, and does not even have to know where the printer is located. Instead, the mobile device only has to locate a print service on a network to which the mobile device is connected, tell the print service where the document is or pass the document to the print service, and the print service will control the printing operation to print the document as requested.

FIG. 2 illustrates an embodiment in which a print service 70 is implemented as part of a Web server on the Internet 72. It will be appreciated, however, the print service architecture according to the invention is scalable such that it can be used in other networks such as corporate intranets for handling print jobs, as will be described in greater detail below. As shown in FIG. 2, the user's mobile device, which in this embodiment may be a Web cell phone 76, a PDA 78, a laptop 80, or any other Internet device, is connected to the Internet 72.

By way of example, in one scenario, a user 82 named "Jane" may carry a Web cell phone 76 when she travels. When she checks into a hotel, she gives her "Internet credentials" to the hotel. The hotel has a Web site 86 on the Internet that hosts a print service 70. Later, while preparing for a meeting with clients, Jane wants to print a document. It is assumed that her documents 92, including the one she wants to print, are stored at a Web storage 90 on the Web. She uses her Web cell phone 76 to connect to the Internet 72, and to access (over the Wireless Application Protocol (WAP)) the Web site 86 of the hotel, which presents a print service interface page 88 that includes queries and options for a print job. Via the interface Web page 88, Jane enters information regarding the print job, including the location of the document, print specification data (e.g., color or black/white, stapled or bonded, number of copies, etc.), and any other required information. In this example, the location of the document 94 to be printed is specified by a Uniform Resource Locator (URL) of the document. She may also specify whether the printed document should be delivered to her hotel room or be sent to the front desk for her to pick up. She then submits the print request 96, and receives via the Web cell phone 76 a confirmation 98 from the print service of receipt of the print request.

The print service 70 includes a component 100, hereinafter referred to as the print service gateway (PSG), for processing print requests from different users over the Internet. When it receives Jane's print request 96, it verifies her hotel guest status using the check-in information in a hotel guest database. It also validates the print request to see whether it contains the required information. If there is any problem, it would notify Jane immediately via her cell phone 76. If both the user status and print request are validated, the print service gateway 100 uses Jane's Internet credentials to gain access to her Web storage 90 where she stores her documents, and uses the URL of the particular document 94 to retrieve that document. After retrieving the document, the print service gateway 100 selects a printer from a pool of printers 106 for handling the print job, and renders the document into a print-ready format suitable for the selected printer. The rendering may be performed using an appropriate application for the particular document format (e.g., Microsoft Word). For that purpose, the print service may maintain a plurality of applications 110 for handling different types of documents. Alternatively, the print service may use external rendering services on the Internet, such as the rendering services 112, 114, 116 in FIG. 2. In that case, the applications are not required. The rendered document is then sent to the selected printer for printing, and the printed document is delivered as specified in the print request.

Even though in this example the mobile device is a Web cell phone, it will be appreciated that the particular type of mobile device used to submit the print request is not critical, and users of laptops and other Internet devices can use the print service 70 in the same way to print documents.

It can be seen from this example that the user's mobile device is not required to carry the particular document to be printed. In this example, the Web cell phone 76 may not even have the memory capacity for storing a copy of the document. Instead, the user only has to specify where the document may be found, and the print service will automatically retrieve the document based on that information and using the user's credentials necessary for gaining access to the document. In this regard, the user's credentials are either already available to the print service (e.g., provided during hotel check-in) or provided in conjunction with the print request, such as by using a certificate or an Internet "passport."

It is possible, however, that the user's mobile device already carries the document. This may be the case, for example, when the user's mobile device is a "rich client" such as a laptop computer. In that scenario, the user can transmit the document directly from her device to the print service gateway as part of the print request data.

It will be appreciated that the user's mobile device does not have to do any rendering of the document or control the printing operation. As a result, there is no need for the mobile device to have the application (e.g., Microsoft Word or Adobe Acrobat Reader) for the particular format of the document, and there is no need to download the printer driver to the device. This is an important advantage, as many mobile devices such as PDAs or Web cell phones do not have the processing power for rendering documents for printing or the memory capacity for holding the applications or print drivers. Moreover, even if the mobile device is a "rich client" such as a laptop that has substantial processing power and storage capacity, it is a rather complicated process to find the right driver to download to the device and then use the device to control the operation the printer. By delegating the print job to a print service on the network (e.g., Internet) accessible by a lightweight mobile device, the user can use the mobile device to print documents substantially wherever she goes and whenever she wants (limited by the network connection), without having to be concerned with the details of the printing operation.

To illustrate the wide applicability of the print service architecture of the invention, another scenario is described below with reference to FIG. 3. In this scenario, Jane is a real-estate agent. While on her way to meet her client, she wants to print the up-to-date home listing from her cell phone 76. To do so, she clicks the "find the nearest print center" function in the menu presented on her cell phone. In this example, Jane's cell phone provider has a Yellow Page service that includes Web links to commercial print centers' Web pages. When she clicks on the "find the nearest print center" function, her cell phone detects her current location and searches its list of print centers. It presents the top five choices in the order of increasing distance from her current location. From this list, Jane picks a print center 124 with the franchise name of, for example, "ABC," by clicking on the link for that print center. She is then connected to ABC's Web server 120 and is presented with ABC's Web page 122 to enter her request. She then enters her print request and payment information via the ABC Web page.

Similar to the example of FIG. 2, the ABC Print Center Web server 120 hosts a print service gateway 126 for receiving print requests. When the user enters the print request, the print service gateway retrieves the document at the URL specified in the request, renders the document for printing, and prints on a printer at the ABC print center 124 selected by Jane. In this embodiment, since documents are to be printed at print centers selected by customers, the print service of ABC on the Web is not required to have local printers.

The print service framework of the invention is scalable and can be used in networks of different sizes. By way of example, another mobile printing scenario is described below with reference to FIG. 4, which illustrates an embodiment in which a print service 132 is implemented in an intranet 136 of a corporation. In this scenario, a user 140 named "Chris" goes to a conference room in another building in his company for a meeting, carrying his network-connected PDA 138 with him. While in the conference room, he realizes that he needs to print a document for the meeting. To do so, Chris does not have to know where the shared printers are in the building or how to install printer drivers. He uses his PDA to access the print service gateway 142 that is hosted on his desktop personal computer (PC) 132 in his office via the corporate intranet 136. The print service gateway 142 has access to all corporate network printers that are otherwise available to Chris' PC 132. It assists Chris to select a particular printer, such as via the printer location map. Using the PDA, Chris interacts with the print service gateway 142 and sends a print request 148 to the print service gateway. The print request identifies the document to be printed, which may be stored on his desktop PC or at a location on the intranet 136, by its URL. It also identifies the target printer based on the information such as the printer's location. Chris's computer installs, if necessary, the needed printer drivers for the target printer on demand. Chris then walks over to the identified printer to pick up the printed document.

Returning to FIG. 2, in one embodiment, a print service 70 includes one or more servers each hosting a print service gateway component 100, and a collection of applications 110 that are used to handle various document formats. For example, the applications may include Microsoft Internet Explorer for HTML documents, Adobe Acrobat Reader for ".PDF" files, and Microsoft Word for ".DOC" documents, etc. In the illustrated embodiment, the print service further includes a collection of printers 106 and corresponding printer drivers that can be used by the applications to generate print-ready output data. The collection of printer drivers varies depending on the particular printers the service supports. For example, a hotel print service may use the same printer model across the board and would need only one printer driver, while an enterprise print service may need many printer drivers due to accumulation of different printer models.

The print service 70 includes a print service user interface component 150 that provides user interfaces to allow users to enter print requests and get confirmation of the requests. It may also provide up-to-date status on the user's print requests and the print service in general. This user interface component varies depending on the service as well as the client (e.g., laptops vs. PDAs with small screens). Behind the user interface is the programming interface for print service gateway that defines how to compose a print request to a print service and receive feedback over the Internet (or an intranet). In one implementation, the user interface component creates the actual print request package and sends it to a print service gateway. In another implementation, the client can access the print service gateway's programming interface directly and send the print request (in XML format) directly to the print service.

In one implementation, the content of a print request includes the following data:

1. The user's "Internet credentials" or Web identity. This information is needed to authenticate the user for document access as well as print service access. It can also be used in logging and billing.
2. The document's content, or its URL.
3. Optionally, the format of the document. If this information is not provided, the print service would determine the format by analyzing the content, though this is generally not efficient.
4. Optionally, the target printer's URL and characteristics such as the model name, PnP ID, secure access code, etc,
5. Optionally, the criteria for selecting a target printer (e.g., location). If this information is missing and no printer URL is given, the print service will select a target printer based on its own criteria, such as load balancing and priority.
6. Optionally, the printing requirements such as color, duplex, stapling. If this information is missing, default settings will be used.

The content of the response generated by the print service 70 includes either a confirmation that the request is accepted or a rejection of the request, and, if accepted, a job ID, which is used in logging and billing. A print request could be rejected due to any of the following and/or other reasons: the user is not authenticated to use the print service; the print service is offline; the document content cannot be retrieved; the document format is not supported; the specified printer is not supported; and the specified printing requirements cannot be satisfied (such as color printing).

Some "rich client" devices, such as laptops, have more processing power and broad application base. They could be more sophisticated in terms of submitting print requests so users could get better print quality and performance. For instance, the device may query the list of supported document formats (e.g., in the order of decreasing preference).

In the embodiment for mobile printing over the Internet illustrated in FIG. 2, the print service gateway (PSG) 100 includes a routing component 160, a rendering component 162, and a logging and billing component 166. The routing component 160 performs the following functions:

Parsing the incoming print requests.
Authenticating the user to use the print service.
Negotiating with the client regarding print capabilities (ex. document formats). This would allow powerful clients to submit preferred format for best results.
Retrieving the document content if needed. Use the provided user credentials if the document has restricted access.
Validating the user's request and give feedback. This includes calling the PSG Rendering component to validate if the conversion from the given source format to the given destination format is supported.
Spooling and scheduling the requests for further processing (rendering and/or printing).
Redirecting the print request to another print service if appropriate. This may be used for service branding. For example, a hotel print service may simply pass through all print requests to a print service contractor for actual processing and printing.

The rendering component 162 of the print service gateway 100 is responsible for converting the source document format to a target format, which is typically a print-ready format. It maintains the information about mapping between supported input formats and output formats. This includes information on what the formats are and what application software or external rendering service is needed to perform the specific mapping. It uses the data-driven approach to provide the extensibility.

When format conversion is done locally, the appropriate application software and printer drivers are installed locally. If external dedicated print rendering services are used, then the print service gateway simply passes through the content (e.g., PS files) without any conversion. To increase the reliability of the format conversion, it is very advantageous to have one canonical intermediate format that all clients could use to submit the document data. Such format would be device-independent. Short of a standard format, a print service could restrict the formats to the set that satisfies its reliability criteria.

Another component of the Web printing service is the logging and billing component, which handles the logging and billing operations for the servicing of the print requests. It is provided for supporting the Internet business model, and is likely not required if the network printing service is implemented in a different type of network. For instance, while a hotel print service will require the billing function, a print service on the intranet of a corporation may not.

As described above, the print service provides a programming interface that allows a client to submit print job requests and to query the job status. In one implementation, there are three mandatory methods that the web print service supports:
CreatePrintJob: allowing the client to submit a print request.
CancelPrintJob: allowing the client to cancel a print request that has been previously submitted.
GetPrintJobData: allowing the client to query the state of a print request that has been previously submitted.

There are also three optional methods that a web print service may choose to support in order to optimize the operations:
IsFormatSupported: allow the client to find out if a particular document format is supported by the print service. A client may want to use this method to verify the format first, especially when embedding the document content directly in the print request.
GetSupportedFormats: allowing the client to get a list of supported document formats. A client may want to use this method to select an optimal format to submit the source document, especially when the client (e.g., a laptop) has the capability to do some forms of format conversion.
GetPrinterModels: allowing the client to find out the list of printer models used by the print service and their associated installable settings (such as duplexer installed or not). This would enable rich clients (such as laptops) to generate high-fidelity printer-ready data and pass through the print service to the printer directly. Few print services are expected to support this method, just those services that accept only printer-ready data.

The details of each of the methods identified above are described below. Follow the description of each method is the "Arguments" list that details all the parameters. It has following attributes:
Data Field: the name of the parameter. It follows the VisualStudio.NET naming convention.
Dir: the direction of the parameter, IN, OUT or IN/OUT ('ref' in C#).
Type: data type, as defined in C#.
M/O: indicating whether the parameter is mandatory ('M') or optional ('O').
Comments: defining the meaning of the parameter and its usage.

If the same parameter appears in multiple methods, it has the same meaning and is defined only in one place.

Following the "Arguments" list is a list of error codes. The error code is returned in the <SOAP:fault> element. The error codes are derived from the IPP status codes and named following the C# naming convention.

1. CreatePrintJob

When CreatePrintJob is called, the print service will create a new print job to represent the new print request and assign a unique job ID. It updates the job data based on what the client has provided and what can actually be supported. If a document URL link is provided, it retrieves the document content on the user's behalf. If everything is validated, it sets the job state to "accepted" and responds to the client while continuing on to print the document. The client can later query the status of a print request, such as the estimated completion time or the actual print settings, via GetPrintJobData. In all cases, the appropriate operation error code is set in its response.

Note that if a print service chooses to accept print-ready data, then it should support the parameter "jobTicket" which encapsulates the complete set of print settings used to generate the print-ready data. "jobTicket" is based on the standard Windows print system schema. If the print service cannot honor all the settings in "jobTicket", it should reject the print request and return ClientErrorNotPossible.

Arguments:
Data Field: jobID
  Dir: OUT; Type: unit; M/O: M
  Comments: The unique print job identification number created by the print service in the range of 1 to $2^{32}-1$. A print service may recycle job Id's while ensuring that no two active print requests have the same Id. This Id is used for subsequent operations such as CancelPrintJob and GetPrintJobData.
Data Field: jobname
  Dir: IN; Type: string; M/O: M
  Comments: The name of the print request, such as the name of the document to be printed.
Data Field: userName
  Dir: IN; Type: string; M/O: M
Comments: The name of the user who submits the print request.
Data Field: UserCredential
  Dir: IN; Type: string; M/O: O
  Comments: Encoded user Passport sign-in ID and password. This credential will be used to authenticate the use of the print service and for print service to retrieve the document content on the user's behalf when the document URL is used. If a print service, such as commercial print shops, requires the user credential, then the client must provide this data. Otherwise, it will receive "ClientErrorNotAuthenticated".
Data Field: docLink
  Dir: IN; Type: string; M/O: O
  Comments: The URL of the document to be printed. If it is missing, the print service should assume that the client will send the document content directly via "docContent" parameter. In most cases, "docLink" is provided, i.e. print by reference. If a print service supports accepting multiple documents in one job, the client could provide multiple URL's in one CreatePrintJob request.
Data Field: docContent
  Dir: IN; Type: byte[ ]; M/O: O
  Comments: The sequence of bytes representing the content of the document to be printed. If this is null and "docLink" is also null, the print service will return with the error code "ClientErrorDocumentAccessError".

Data Field: docFormat
    Dir: IN; Type: string; M/O: O
Comments: The format of the document content, such as "PostScript Level 2" or "DOC". If this parameter is not supplied, the print service will have to parse the file name and/or the content in order to figure out the format.

Data Field: targetPrinter
    Dir: IN; Type: string; M/O: O
Comments: The name of the targeted printer.
    Data Field: numOfCopies
    Dir: IN; Type: uint; M/O: O
Comments: The number of copies to be printed. The default is 1. All printed pages will be collated.

Data Field: duplex
    Dir: IN; Type: string; M/O: O
Comments: Defining how the logical pages will be printed on physical pages. Options include: "one-sided printing", "two-sided printing along the long edge", and "two-sided printing along the short edge".

Data Field: nUp
    Dir: IN; Type: string; M/O: O
Comments: Defining how the logical pages will be laid out on one side of a physical page. Choose from "1-up", "2-up", and "4-up". The default is "1-up".

Data Field: is Color
    Dir: IN; Type: bool; M/O: O
Comments: If "true," print the document in color. Otherwise, print in Black/White. The default is Black/White.

Data Field: paperType
    Dir: IN; Type: string; M/O: O
Comments: The type of paper to be used in printing the document, such as "201b Standard White Paper". The default is set by each print service. If it is specified by the client, it will be verified against other job requirements. If there is conflict, the service should pick the appropriate paper type based on its priorities and update the job data accordingly.

Data Field: bindingType
    Dir: IN; Type: string; M/O: O
Comments: The type of binding to be used, such as "none", "coil", "comb", "stapled". The default is "none". If it is specified by the client, it will be verified against other job requirements. If there is conflict, the service should pick the appropriate binding type and update the job data accordingly.
    Data Field: jobTicket
    Dir: IN; Type: Byte[ ]; M/O: O
Comments: An XML blob that describes the complete set of print settings used to generate print-ready data. Used only when submitting print-ready ("raw") documents. It follows the standard Windows print system schema.

Data Field: <custom fields>
    Dir: IN; Type: N/A; M/O: O
Comments: Each print service may define additional fields, such as "promotion code."

Error Code:
Code: 0x0000; Meaning: SuccessfulOk; Usage: The operation is successful.
Code: 0x0400; Meaning: ClientErrorBadRequest; Usage: The request is ill-formed, such as bad parameter values.
Code: 0x0402; Meaning: ClientErrorNotAuthenticated; Usage: The user is not authenticated to use the print service.
Code: 0x0403; Meaning: ClientErrorNotAuthorized; Usage: The user is not authorized to create a print job.
Code: 0x0404; Meaning: ClientErrorNotPossible; Usage: The print service cannot meet the requirements, such as not being able to honor all settings in a jobTicket when the client submits print-ready data.
Code: 0x040a; Meaning: clientErrorDocumentFormatNotSupported; Usage: The source document format is not supported.
Code: 0x0411; Meaning: ClientErrorDocumentFormatError; Usage: The source document is ill-formed.
Code: 0x0412; Meaning: ClientErrorDocumentAccessError; Usage: The print service cannot access the document content.
Code: 0x0500; Meaning: ServerErrorInternalError; Usage: This is a catch-all error code for all internal errors.
Code: 0x0506; Meaning: ServerErrorNotAcceptingJobs; Usage: The print service is not accepting new print jobs for some reason.
Code: 0x0509; Meaning: ServerErrorMultipleDocumentJobsNotSupported; Usage: The print service cannot accept a print request that contains multiple documents.

2. CancelPrintJob

The print service deletes the given print job after verifying the user credential.

Arguments:
Data Field: jobID
    Dir: IN; Type: uint; M/O: M
Comments: The unique job identification # as returned in CreatePrintJob response.

Data Field: userCredential
    Dir: IN; Type: string; M/O: O
Comments: If a job was created with the user credential, then the same credential is required for canceling it.

Error Code:
Code: 0x0000; Code Meaning: SuccessfulOK; Usage: The job is successfully deleted.
Code: 0x0400; Code Meaning: ClientErrorBadRequest; Usage: The request is ill-formed, such as invalid job ID or the job has already been canceled.
Code: 0x0402; Code Meaning: ClientErrorNotAuthenticated; Usage: The user is not authenticated.
Code: 0x0403; Code Meaning: ClientErrorNotAuthorized; Usage: The user is not authorized to delete the given job (ex. someone else's job).
Code: 0x0500; Code Meaning: ServerErrorInternalError; Usage: Catch-all error code for all internal errors.

3. GetPrintJobData

This method returns the set of print job data associated with the given job ID, as listed below. The job may be in any of the state: "accepted", "printing", "cancelled", or "completed". Each print service decides how long it will maintain the data for a print job.

Note that when a print request involves a device-independent document format (such as .DOC), the print settings that come with the request are treated as "suggestions". The service may adjust the settings in order to resolve conflicts (such as "color" AND "two sided printing") based on its capabilities. The client can call GetPrintJobData to find out the actual settings used in printing and notify the user if appropriate.

Arguments:
Data Field: jobID
    Dir: IN; Type: uint; M/O: M
Comments: The unique job identification # as returned in CreatePrintJob response.

Data Field: userCredential
    Dir: IN; Type: string; M/O: O
Comments: Required if the print job was created with the user credential.

Data Field: jobState
    Dir: OUT; Type: string; M/O: M
    Comments: The current status of the job: "accepted", "printing", "cancelled", or "completed".
Data Field: timeOfSubmission
    Dir: OUT; Type: string; M/O: M
    Comments: Encoded time stamp of when the print job is accepted. The format is ISO 8601. Local time is represented as YYYYMMDDTHHMMSS, and UTC time as YYYYMMDDTHHMMSSZ.
Data Field: jobName
    Dir: OUT; Type: string; M/O: M
    Comments: The name of the print job.
Data Field: userName
    Dir: OUT; Type: string; M/O: M
    Comments: The name of the user who owns this job.
Data Field: printer
    Dir: OUT; Type: string; M/O: O
    Comments: The printer to which the print job is sent.
Data Field: numOfCopies
    Dir: OUT; Type: uint; M/O: M
    Comments: The # of copies to be printed.
Data Field: nUp
    Dir: OUT; Type: string; M/O: M
    Comments: The layout description. If the user has specified a layout format when creating the print job, it may have been modified to resolve conflicts and other constraints.
Data Field: duplex
    Dir: IN; Type: string; M/O: M
    Comments: The duplex setting. If the user has specified a duplex setting when creating the print job, it may have been modified to resolve conflicts and other constraints.
Data Field: is Color
    Dir: OUT; Type: bool; M/O: M
    Comments: Indicating if this is a color job or not.
Data Field: paperType
    Dir: OUT; Type: string; M/O: M
    Comments: The type of paper used for the print job. If the user has specified a paper type when creating the print job, it may have been modified to resolve conflicts and other constraints.
Data Field: bindingType
    Dir: OUT; Type: string; M/O: M
    Comments: The type of binding used for the print job. If the user has specified a binding type when creating the print job, it may have been modified to resolve conflicts and other constraints.
Data Field: completionTime
    Dir: OUT; Type: string; M/O: O
    Comments: The deadline for when the print job is expected to be completed. The format is ISO 8601. Local time is represented as YYYYMMDDTHHMMSS, and UTC time as YYYYMMDDTHHMMSSZ.
Data Field: printingCost
    Dir: OUT; Type: string; M/O: O
    Comments: Used when the service is charging for printing.
Data Field: mailingCost
    Dir: OUT; Type: string; M/O: O
    Comments: Used when the printed pages are mailed to the user.
Error Code:
GetPrintJobData has the same set of error codes as CancelPrintJob.
4. IsFormatSupported
    If a print service supports this method, it should return true if the given document format is supported. Otherwise, return false.
Arguments:
Data Field: docFormat
    Dir: IN; Type: string; M/O: M
    Comments: Document format name.
Data Field: supported
    Dir: OUT; Type: bool; M/O: M
    Comments: true or false.
Error Code:
Code: 0x0000; Code Meaning: SuccessfulOK; Usage: The request is fulfilled successfully.
Code: 0x0400; Code Meaning: ClientErrorBadRequest; Usage: The request is ill-formed, such as null 'docFormat'.
Code: 0x0500; Code Meaning: ServerErrorInternalError; Usage: Catch-all error code for all internal errors.
Code: 0x0501; Code Meaning: ServerErrorOperationNotSupported; Usage: The print service does not support this method.
5. GetSupportedFormats
    If a print service supports this method, it should return the list of supported document formats.
Arguments:
Data Field: supportedFormats
    Dir: OUT; Type: string; M/O: M
    Comments: Array of doc formats.
Error Code:
    It has the same set of error codes as IsFormatSupported. Note that if the client has means (such as a special printer driver) to do document format conversions (such as from Visio format to PDF), it can use GetSupportedFormats to find an optimal submission format. Otherwise, it can use IsFormatSupported to query if the document in question can be printed. A client does not have to call either method to validate the document format. If it doesn't and the submitted format is not supported, the print service would return ClientErrorDocumentFormatNotSupported error code.
6. GetPrinterModels
    If a print service supports this method, it should return the list of printer names (such as "HP LaserJet 8000") that are being used. This method is targeted for rich PC clients to send printer-ready data to the print service directly for optimal print rendering quality.
Arguments:
Data Field: printerModels
    Dir: OUT; Type: string; M/O: M
    Comments: Array of printer model names.
Error Code:
    It has the same set of error codes as IsFormatSupported.
WSDL (Web Service Description Language) Definition
    In accordance with a feature of an embodiment of the invention, in order to enhance the universality of the print service interface of Web print services on the Internet, a Web Service Description Language (WSDL) based on the XML is provided to describing the print service interface. It defines the message formats that clients need to follow when exchanging messages with a web print service. Note that for a particular implementation the WSDL description may vary slightly in terms of the required and optional parameters ('minOccurs'). Also, the default namespace and the location of the print service will need to be modified.

```
<?xml version="1.0" encoding="utf-8"?>
<definitions
  xmlns:http="http://schemas.xmlsoap.org/wsdl/http/"
  xmlns:soap="http://schemas.xmlsoap.org/wsdl/soap/"
  xmlns:s="http://www.w3.org/2001/XMLSchema"
```

```
xmlns:s0="http://tempuri.org/"
xmlns:soapenc="http://schemas.xmlsoap.org/soap/encoding/"
xmlns:tm="http://microsoft.com/wsdl/mime/textMatching/"
xmlns:mime="http://schemas.xmlsoap.org/wsdl/mime/"
targetNamespace="http://tempuri.org/"
xmlns="http://schemas.xmlsoap.org/wsdl/">
   <types>
      <s:schema elementFormDefault="qualified"
targetNamespace="http://tempuri.org/">
         <s:element name="CreatePrintJob">
            <s:complexType>
               <s:sequence>
                  <s:element minOccurs="1" maxOccurs="1"
name="jobName" type="s:string" />
                  <s:element minOccurs="1" maxOccurs="1"
name="userName" type="s:string" />
                  <s:element minOccurs="0" maxOccurs="1"
name="userCredential" type="s:string" />
                  <s:element minOccurs="0" maxOccurs="1"
name="docLink" type="s:string" />
                  <s:element minOccurs="0" maxOccurs="1"
name="docContent" type="s:base64Binary" />
                  <s:element minOccurs="0" maxOccurs="1"
name="docFormat" type="s:string" />
                  <s:element minOccurs="0" maxOccurs="1"
name="targetPrinter" type="s:string" />
                  <s:element minOccurs="0" maxOccurs="1"
name="numOfCopies" type="s:unsignedInt" />
                  <s:element minOccurs="0" maxOccurs="1"
name="duplex" type="s:string" />
                  <s:element minOccurs="0" maxOccurs="1"
name="nUp" type="s:string" />
                  <s:element minOccurs="0" maxOccurs="1"
name="isColor" type="s:boolean" />
                  <s:element minOccurs="0" maxOccurs="1"
name="paperType" type="s:string" />
                  <s:element minOccurs="0" maxOccurs="1"
name="bindingType" type="s:string" />
                  <s:element minOccurs="0" maxOccurs="1"
name="jobTicket" type="s:base64Binary" />
               </s:sequence>
            </s:complexType>
         </s:element>
         <s:element name="CreatePrintJobResponse">
            <s:complexType>
               <s:sequence>
                  <s:element minOccurs="1" maxOccurs="1"
name="CreatePrintJobResult" type="s:unsignedInt" />
                  <s:element minOccurs="1" maxOccurs="1"
name="jobID" type="s:unsignedInt" />
               </s:sequence>
            </s:complexType>
         </s:element>
         <s:element name="CancelPrintJob">
            <s:complexType>
               <s:sequence>
                  <s:element minOccurs="1" maxOccurs="1"
name="jobID" type="s:unsignedInt" />
                  <s:element minOccurs="0" maxOccurs="1"
name="userCredential" type="s:string" />
               </s:sequence>
            </s:complexType>
         </s:element>
         <s:element name="CancelPrintJobResponse">
            <s:complexType>
               <s:sequence>
                  <s:element minOccurs="1" maxOccurs="1"
name="CancelPrintJobResult" type="s:unsignedInt" />
               </s:sequence>
            </s:complexType>
         </s:element>
         <s:element name="GetPrintJobData">
            <s:complexType>
               <s:sequence>
                  <s:element minOccurs="1" maxOccurs="1"
name="jobID" type="s:unsignedInt" />
                  <s:element minOccurs="0" maxOccurs="1"
name="userCredential" type="s:string" />
               </s:sequence>
            </s:complexType>
         </s:element>
         <s:element name="GetPrintJobDataResponse">
            <s:complexType>
               <s:sequence>
                  <s:element minOccurs="1" maxOccurs="1"
name="GetPrintJobDataResult" type="s:unsignedInt" />
                  <s:element minOccurs="1" maxOccurs="1"
name="jobState" type="s:string" />
                  <s:element minOccurs="0" maxOccurs="1"
name="errorCode" type="s:unsignedInt" />
                  <s:element minOccurs="1" maxOccurs="1"
name="timeOfSubmission" type="s:string" />
                  <s:element minOccurs="1" maxOccurs="1"
name="jobName" type="s:string" />
                  <s:element minOccurs="1" maxOccurs="1"
name="userName" type="s:string" />
                  <s:element minOccurs="0" maxOccurs="1"
name="printer" type="s:string" />
                  <s:element minOccurs="1" maxOccurs="1"
name="numOfCopies" type="s:unsignedInt" />
                  <s:element minOccurs="1" maxOccurs="1"
name="duplex" type="s:string" />
                  <s:element minOccurs="1" maxOccurs="1"
name="nUp" type="s:string" />
                  <s:element minOccurs="1" maxOccurs="1"
name="isColor" type="s:boolean" />
                  <s:element minOccurs="1" maxOccurs="1"
name="paperType" type="s:string" />
                  <s:element minOccurs="1" maxOccurs="1"
name="bindingType" type="s:string" />
                  <s:element minOccurs="0" maxOccurs="1"
name="completionTime" type="s:string" />
                  <s:element minOccurs="0" maxOccurs="1"
name="printingCost" type="s:string" />
                  <s:element minOccurs="0" maxOccurs="1"
name="mailingCost" type="s:string" />
               </s:sequence>
            </s:complexType>
         </s:element>
         <s:element name="IsFormatSupported">
            <s:complexType>
               <s:sequence>
                  <s:element minOccurs="1" maxOccurs="1"
name="docFormat" type="s:string" />
               </s:sequence>
            </s:complexType>
         </s:element>
         <s:element name="IsFormatSupportedResponse">
            <s:complexType>
               <s:sequence>
                  <s:element minOccurs="1" maxOccurs="1"
name="IsFormatSupportedResult" type="s:unsignedInt" />
                  <s:element minOccurs="1" maxOccurs="1"
name="supported" type="s:boolean" />
               </s:sequence>
            </s:complexType>
         </s:element>
         <s:element name="GetSupportedDocFormats">
            <s:complexType />
         </s:element>
         <s:element name="GetSupportedDocFormatsResponse">
            <s:complexType>
               <s:sequence>
                  <s:element minOccurs="1" maxOccurs="1"
name="GetSupportedDocFormatsResult" type="s:unsignedInt" />
                  <s:element minOccurs="1" maxOccurs="1"
name="supportedDocFormats" type="s0:ArrayOfString" />
               </s:sequence>
            </s:complexType>
         </s:element>
         <s:complexType name="ArrayOfString">
            <s:sequence>
               <s:element minOccurs="0" maxOccurs="unbounded"
name="string" nillable="true" type="s:string" />
            </s:sequence>
         </s:complexType>
         <s:element name="GetPrinterModels">
            <s:complexType />
         </s:element>
         <s:element name="GetPrinterModelsResponse">
```

```
            <s:complexType>
                <s:sequence>
                    <s:element minOccurs="1" maxOccurs="1"
name="GetPrinterModelsResult" type="s:unsignedInt" />
                    <s:element minOccurs="1" maxOccurs="1"
name="printerModels" type="s0:ArrayOfString" />
                </s:sequence>
            </s:complexType>
        </s:element>
        <s:element name="unsignedInt" type="s:unsignedInt" />
    </s:schema>
</types>
<message name="CreatePrintJobSoapIn">
    <part name="parameters" element="s0:CreatePrintJob" />
</message>
<message name="CreatePrintJobSoapOut">
    <part name="parameters"
element="s0:CreatePrintJobResponse" />
</message>
<message name="CancelPrintJobSoapIn">
    <part name="parameters" element="s0:CancelPrintJob" />
</message>
<message name="CancelPrintJobSoapOut">
    <part name="parameters"
element="s0:CancelPrintJobResponse" />
</message>
<message name="GetPrintJobDataSoapIn">
    <part name="parameters" element="s0:GetPrintJobData" />
</message>
<message name="GetPrintJobDataSoapOut">
    <part name="parameters"
element="s0:GetPrintJobDataResponse" />
</message>
<message name="IsFormatSupportedSoapIn">
    <part name="parameters" element="s0:IsFormatSupported"
/>
</message>
<message name="IsFormatSupportedSoapOut">
    <part name="parameters"
element="s0:IsFormatSupportedResponse" />
</message>
<message name="GetSupportedDocFormatsSoapIn">
    <part name="parameters"
element="s0:GetSupportedDocFormats" />
</message>
<message name="GetSupportedDocFormatsSoapOut">
    <part name="parameters"
element="s0:GetSupportedDocFormatsResponse" />
</message>
<message name="GetPrinterModelsSoapIn">
    <part name="parameters" element="s0:GetPrinterModels" />
</message>
<message name="GetPrinterModelsSoapOut">
    <part name="parameters"
element="s0:GetPrinterModelsResponse" />
</message>
<portType name="WebPrintServiceSoap">
    <operation name="CreatePrintJob">
        <input message="s0:CreatePrintJobSoapIn" />
        <output message="s0:CreatePrintJobSoapOut" />
    </operation>
    <operation name="CancelPrintJob">
        <input message="s0:CancelPrintJobSoapIn" />
        <output message="s0:CancelPrintJobSoapOut" />
    </operation>
    <operation name="GetPrintJobData">
        <input message="s0:GetPrintJobDataSoapIn" />
        <output message="s0:GetPrintJobDataSoapOut" />
    </operation>
    <operation name="IsFormatSupported">
        <input message="s0:IsFormatSupportedSoapIn" />
        <output message="s0:IsFormatSupportedSoapOut" />
    </operation>
    <operation name="GetSupportedDocFormats">
        <input message="s0:GetSupportedDocFormatsSoapIn" />
        <output message="s0:GetSupportedDocFormatsSoapOut" />
    </operation>
    <operation name="GetPrinterModels">
        <input message="s0:GetPrinterModelsSoapIn" />
        <output message="s0:GetPrinterModelsSoapOut" />
    </operation>
</portType>
<binding name="WebPrintServiceSoap"
type="s0:WebPrintServiceSoap">
    <soap:binding
transport="http://schemas.xmlsoap.org/soap/http"
style="document" />
    <operation name="CreatePrintJob">
        <soap:operation
soapAction="http://tempuri.org/CreatePrintJob"
style="document" />
        <input>
            <soap:body use="literal" />
        </input>
        <output>
            <soap:body use="literal" />
        </output>
    </operation>
    <operation name="CancelPrintJob">
        <soap:operation
soapAction="http://tempuri.org/CancelPrintJob"
style="document" />
        <input>
            <soap:body use="literal" />
        </input>
        <output>
            <soap:body use="literal" />
        </output>
    </operation>
    <operation name="GetPrintJobData">
        <soap:operation
soapAction="http://tempuri.org/GetPrintJobData"
style="document" />
        <input>
            <soap:body use="literal" />
        </input>
        <output>
            <soap:body use="literal" />
        </output>
    </operation>
    <operation name="IsFormatSupported">
        <soap:operation
soapAction="http://tempuri.org/IsFormatSupported"
style="document" />
        <input>
            <soap:body use="literal" />
        </input>
        <output>
            <soap:body use="literal" />
        </output>
    </operation>
    <operation name="GetSupportedDocFormats">
        <soap:operation
soapAction="http://tempuri.org/GetSupportedDocFormats"
style="document" />
        <input>
            <soap:body use="literal" />
        </input>
        <output>
            <soap:body use="literal" />
        </output>
    </operation>
    <operation name="GetPrinterModels">
        <soap:operation
soapAction="http://tempuri.org/GetPrinterModels"
style="document" />
        <input>
            <soap:body use="literal" />
        </input>
        <output>
            <soap:body use="literal" />
        </output>
    </operation>
</binding>
<service name="WebPrintService">
    <documentation>web print service.</documentation>
    <port name="WebPrintServiceSoap"
binding="s0:WebPrintServiceSoap">
        <soap:address
location="http://localhost/PCPrintPortal/WebPrintService.asm
```

-continued

```
            x" />
        </port>
    </service>
</definitions>
```

In view of the many possible embodiments to which the principles of this invention may be applied, it should be recognized that the embodiment described herein with respect to the drawing figures is meant to be illustrative only and should not be taken as limiting the scope of invention. Therefore, the invention as described herein contemplates all such embodiments as may come within the scope of the following claims and equivalents thereof.

What is claimed is:

1. In a networking environment, a method for providing a print service, the method comprising:
   automatically detecting a location of a client;
   receiving a client selection of a print center from a plurality of print centers presented to the client, the plurality of print centers being presented to the client based at least in part on the physical proximity of each print center to the location of the client;
   presenting a service interface associated with the selected print center for a client to enter print request data, the service interface including a list of file extension formats supported by the selected print center and the print request data comprising:
      credentials associated with the client and enabling access to a non-HTML document associated with the client and a URL of the non-HTML document;
      a document file format selected from the list of file extension formats; and
      location criteria for the print service to use in selecting a target printing device to print the non-HTML document, the location criteria not identifying a printing device to be used to print the document;
   validating the print request data effective to determine that the credentials enable access to the non-HTML document and providing feedback to the client;
   obtaining the non-HTML document to be printed;
   rendering the non-HTML document into the document file format for printing; and
   printing the rendered document in accordance with the print request data.

2. The method of claim 1 wherein the networking environment comprises the Internet.

3. The method of claim 2 wherein the service interface comprises a Web page via which the client enters the print request data.

4. The method of claim 2 wherein obtaining the non-HTML document comprises receiving a transmission of the non-HTML document from the client over the Internet.

5. The method of claim 1 wherein rendering the non-HTML document comprises running an application corresponding to a format of the non-HTML document.

6. The method of claim 1 wherein rendering the non-HTML document comprises invoking a remote printing rendering service.

7. The method of claim 1 wherein printing the rendered document comprises printing on a local printer of the print service.

8. The method of claim 1 wherein printing the rendered document comprises printing on a remote printer.

9. The method of claim 1 wherein the networking environment comprises an intranet.

10. A computer-readable storage medium containing computer-executable instructions for a method for a user of a mobile computing device to print a non-HTML document, the method comprising:
   automatically detecting a location of the mobile computing device;
   presenting to the user a plurality of print centers via the mobile computing device, the plurality of print centers being presented based at least in part on a physical proximity of each of the plurality of print centers to the location of the mobile computing device;
   receiving a selection from the user of a print center from the plurality of print centers;
   using the mobile computing device to connect to a network on which a print service associated with the selected print center resides;
   accessing a service interface presented by the print service for receiving print requests, the service interface including a list of file extension formats supported by the print service;
   entering, via the service interface, print request data for printing the non-HTML document, the print request data comprising:
      a URL of the non-HTML document and credentials associated with the user of the mobile computing device, the credentials enabling access to the non-HTML document;
      a document file format for rendering the non-HTML document, wherein the document file format is selected from the list of file extension formats; and
      location criteria for the print service to use in selecting a target printing device to print the non-HTML document, the location criteria not identifying a printing device to be used to print the document; and
   receiving a confirmation from the print service acknowledging receipt of the print request data.

11. The computer-readable storage medium of claim 10 wherein the service interface comprises a Web page via which the user enters the print request data.

12. The computer-readable storage medium of claim 10 wherein entering print request data comprises sending the non-HTML document to the print service over the Internet.

13. A method for providing a print service, the method comprising:
   causing to be displayed on a portable computing device a print service interface for a client to enter print request data, the print service interface displaying a list of file extension formats supported by the print service, the print request data comprising:
      credentials associated with the client and enabling access to a non-HTML document associated with the client and a URL of the non-HTML document, the credentials further enabling the print service to bill the client for printing the non-HTML document;
      location criteria for the print service to use in selecting a target printing device to print the non-HTML document, the location criteria not identifying a printing device to be used to print the document;
      a file format chosen by the client from the displayed list of file extension formats to be used in printing the non-HTML document; and
      printing device settings for printing the non-HTML document;
   validating the print request data effective to determine that the credentials enable access to the non-HTML document and providing feedback to the client, the feedback comprising a confirmation that the print request data has been received and a print job identifier;
obtaining the non-HTML document to be printed;
rendering the non-HTML document into a document format that corresponds to the file format chosen by the client for printing;
causing to be printed the rendered non-HTML document in accordance with the print request data.

14. One or more computer-readable storage media containing computer-executable instructions that, when executed, implement a method comprising:
displaying on a portable computing device a print service interface for a client to enter print request data, the print service interface displaying a list of document file formats supported by the print service, the list of document file formats comprising a plurality of filename extensions supported by the print service, the print request data comprising:
credentials associated with the client and enabling access to a non-HTML document associated with the client and a URL of the non-HTML document, the credentials further enabling the print service to bill the client for printing the non-HTML document;
location criteria for the print service to use in selecting a target printing device to print the non-HTML document, the location criteria not identifying a printing device to be used to print the document;
a document file format chosen by the client from the displayed list of document file formats to be used in printing the non-HTML document; and
printing device settings for printing the non-HTML document;
validating the print request data effective to determine that the credentials enable access to the non-HTML document and providing feedback to the client, the feedback comprising a confirmation that the print request data has been received and a print job identifier;
obtaining the non-HTML document to be printed;
rendering the non-HTML document into the document file format chosen by the client for printing;
printing the rendered non-HTML document in accordance with the print request data.

15. A system comprising:
one or more processors;
one or more computer-readable storage media storing computer-executable instructions that, when executed by the one or more processors, cause the system to:
initiate a print service interface for display on a portable computing device, the print service interface configured to enable a client to enter print request data, the print service interface displaying a list of file extension formats supported by the print service, the print request data comprising:
credentials associated with the client and enabling access to a non-HTML document associated with the client and a URL of the non-HTML document, the credentials further enabling the print service to bill the client for printing the non-HTML document;
location criteria for the print service to use in selecting a target printing device to print the non-HTML document, the location criteria not identifying a printing device to be used to print the document;
a file format chosen by the client from the displayed list of file extension formats to be used in printing the non-HTML document; and
printing device settings for printing the non-HTML document;
validate the print request data effective to determine that the credentials enable access to the non-HTML document and providing feedback to the client, the feedback comprising a confirmation that the print request data has been received and a print job identifier;
obtain the non-HTML document to be printed;
render the non-HTML document into a document format that corresponds to the file format chosen by the client for printing;
cause to be printed the rendered non-HTML document in accordance with the print request data.

* * * * *